Sept. 15, 1931.  G. R. METCALF, JR  1,823,553

CONDUIT FITTING

Filed Oct. 22, 1928

George R. Metcalf Jr
INVENTOR

BY
ATTORNEYS.

Patented Sept. 15, 1931

1,823,553

UNITED STATES PATENT OFFICE

GEORGE R. METCALF, JR., OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT FITTING

Application filed October 22, 1928. Serial No. 314,025.

This invention is designed to render conduit fittings adapted to secure threadless conduits water-proof. With most of such devices it is difficult to form the conduit engaging features in such a manner as to render them water-proof. In very many places such water-proofing is not required. The present fitting is so formed that the water-proofing thereof may, or may not be utilized as the occasion requires. Features and details of the invention will appear from the specification and claims.

A preferred embodiment of the invention is illustrated in the accompanying drawings as follows:—

Figure 1:
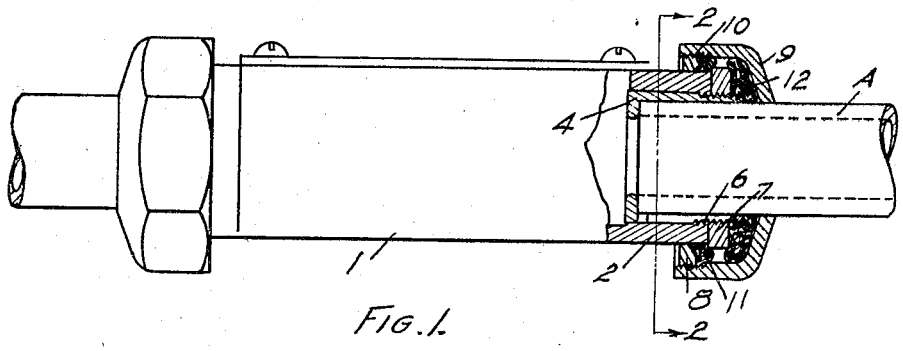

Fig. 1 shows a side elevation of a conduit box, partly in section to better show construction.

Figure 2:
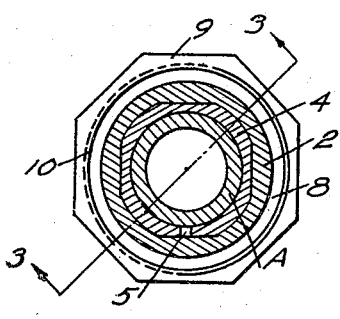

Fig. 2 a section on the line 2—2 in Fig. 1.

Figure 3:
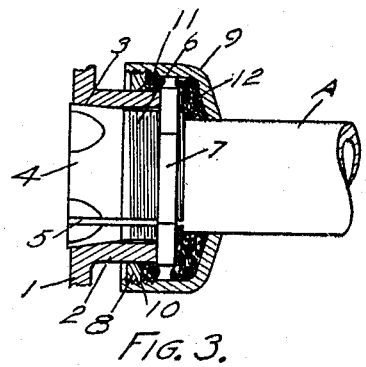

Fig. 3 a section on the line 3—3 in Fig. 2.

1 marks the box. This is provided with a body sleeve 2 which is adapted to receive a conduit. The body sleeve has preferably a wedge surface 3 adapted to engage a wedge surface on a contractible sleeve 4, the contractible sleeve being provided with a longitudinal slot 5. The contractible sleeve is screw-threaded at 6 and a nut 7 is arranged on the screw-threaded end adapted to draw the sleeve into the opening and to contract the same against an inserted conduit A. This construction of fitting is in quite general use and so far forms no part of the present invention.

An externally screw-threaded ring 8 is arranged around the body sleeve and a closure cap 9 has interior screw threads 10 engaging the ring 8. A gasket 11 is arranged between the nut and the ring 8 and a gasket 12 within the cap 9 and the outer surface of the nut and end of the sleeve 4. The sleeve is set up on the ring thus forcing the gaskets into closing engagement with the adjacent parts. While I have shown the ring as a separate ring which may be forced over the end of the sleeve I do not wish to be limited to the separate formation of the ring 8 and while I have shown a special form of fitting for engaging a threadless conduit I do not wish to be limited to this particular fitting.

What I claim as new is:—

1. In a conduit fitting, the combination of a body sleeve having a conduit-receiving opening; a slotted sleeve in the opening, the walls of the opening and sleeve having wedging surfaces in engagement operating with the relative endwise movement of the sleeves to contract the contractible sleeve; a ring on the body sleeve; a closure cap screwed on to the ring; and a gasket enclosed and compressed by the cap.

2. In a conduit fitting, the combination of a body sleeve having a conduit-receiving opening; a slotted sleeve in the opening, the walls of the opening and sleeve having wedging surfaces in engagement operating with the relative endwise movement of the sleeves to contract the contractible sleeve; a nut on the outer end of the fitting adapted to force the sleeves relatively endwise to contract the contractible sleeve; a ring on the body sleeve; a closure cap screwed on to the ring enclosing the nut; and a gasket enclosed and compressed by the cap.

3. In a conduit fitting, the combination of a body sleeve having a conduit-receiving opening; a slotted sleeve in the opening, the walls of the opening and sleeve having wedging surfaces in engagement operating with the relative endwise movement of the sleeves to contract the contractible sleeve; a nut on the outer end of the fitting adapted to force the sleeves relatively endwise to contract the contractible sleeve; a ring on the body sleeve; a closure cap screwed on to the ring enclosing the nut; and gaskets each side of the nut enclosed and compressed by the cap.

4. In a conduit fitting, the combination of a body sleeve having a conduit-receiving opening; a slotted sleeve in the opening, the walls of the opening and sleeve having wedging surfaces in engagement operating with the relative endwise movement of the sleeves to contract the contractible sleeve; a nut on the outer end of the fitting adapted to force the sleeve relatively endwise to contract the contractible sleeve; a ring extending around the outer periphery of and separable from the body sleeve retained on the body sleeve by the nut; a closure cap screwed on to the ring enclosing the nut; and a gasket enclosed and compressed by the cap.

5. In a conduit fitting, the combination of a body sleeve having a conduit-receiving opening; a slotted sleeve in the opening, the walls of the opening and sleeve having wedging surfaces in engagement operating with the relative endwise movement of the sleeves to contract the contractible sleeve; a nut on the outer end of the fitting adapted to force the sleeves relatively endwise to contract the contractible sleeve; a ring extending around the outer periphery of and separable from the body sleeve retained on the body sleeve by the nut; a closure cap screwed on to the ring enclosing the nut; and gaskets each side of the nut enclosed and compressed by the cap.

In testimony whereof I have hereunto set my hand.

GEORGE R. METCALF, Jr.